United States Patent Office 2,958,977
Patented Nov. 8, 1960

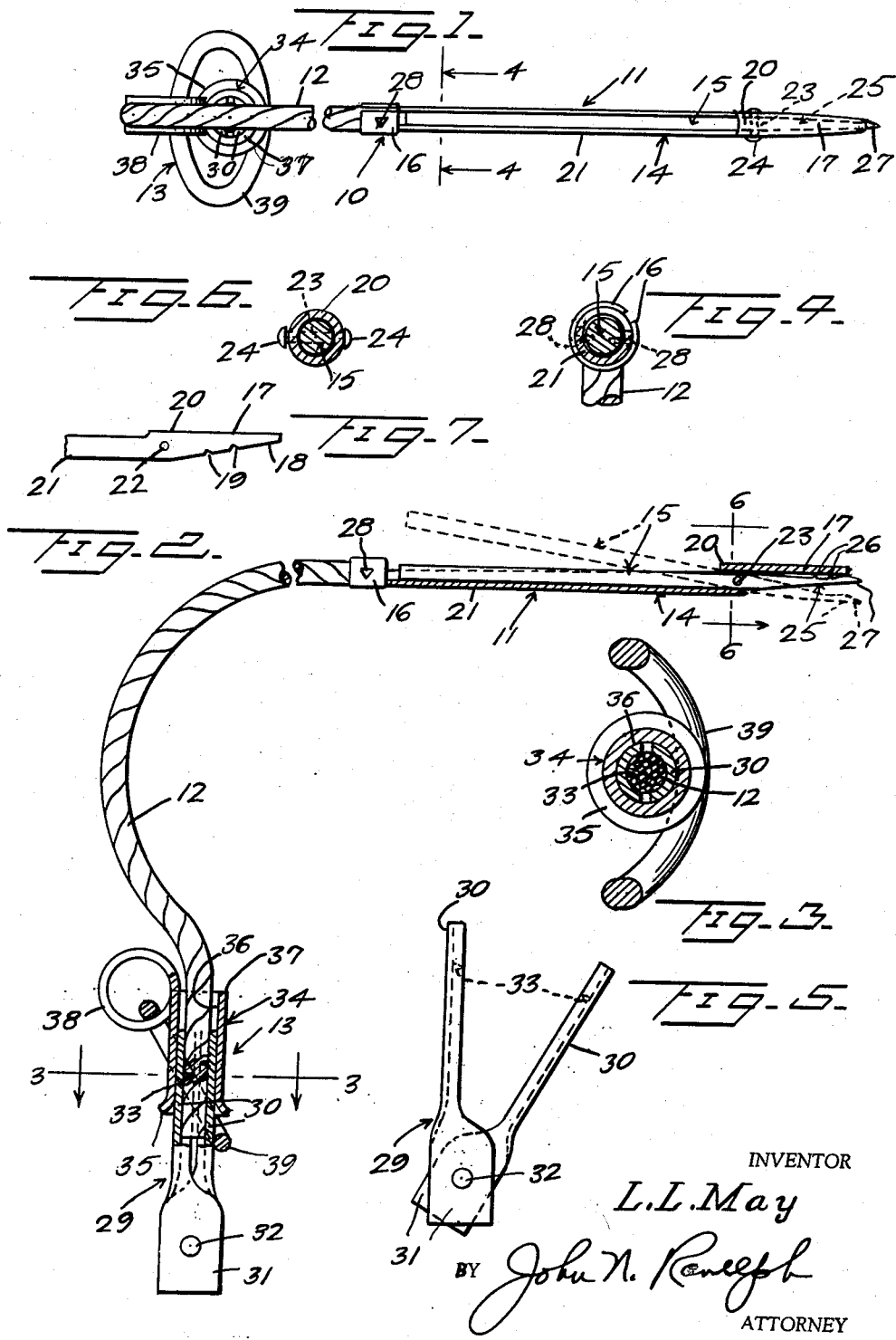

2,958,977

COMBINATION FISH STRINGER AND HOOK EXTRACTOR

Lawrence L. May, Ruston, La. (Box 206, Columbia, La.)

Filed Nov. 3, 1958, Ser. No. 771,568

4 Claims. (Cl. 43—53.5)

This invention relates to a novel fishing implement comprising a fish stringer including a needle for threading a string or cord through fish and which needle additionally forms a slender pliers-type implement which may be effectively utilized for gripping a fishhook for extracting the hook from a fish, where the hook is lodged too deep to be engaged by the fingers.

A further object of the invention is to provide a combination fish stringer and hook extractor including a removable abutment means of unique construction which can be readily detached from an end of the string or cord, located remote from the stringer needle, to permit the strung fish to slide freely off of the end of the cord, from which the abutment is removed, to thereby eliminate the necessity of removing the fish singularly over the needle.

Various other objects and advantages of the invention will hereinafter become more fully apparent from the following description of the drawing, illustrating a presently preferred embodiment thereof, and wherein:

Figure 1 is a fragmentary top plan view showing the combination fish stringer and hook extractor;

Figure 2 is a view partly in side elevation and partly in vertical section thereof;

Figure 3 is an enlarged horizontal sectional view, taken substantially along a plane as indicated by the line 3—3 of Figure 2;

Figure 4 is an enlarged fragmentary cross sectional view, taken substantially along a plane as indicated by the line 4—4 of Figure 1;

Figure 5 is an enlarged side elevational view of a part of the fish stringer;

Figure 6 is an enlarged cross sectional view of a part of the device, taken substantially along the line 6—6 of Figure 2, and Figure 7 is a fragmentary side elevational view of a portion of the fish stringing needle and hook extractor.

Referring more specifically to the drawing, the combination fish stringer and fishhook extractor in its entirety is designated generally 10 and broadly comprises a combination stringing needle and hook extractor, designated generally 11, a stringer cord or flexible element 12, and a readily removable abutment or stop, designated generally 13.

The combination stringing needle and fishhook extractor 11 comprises an elongated tube segment 14 and an elongated rod 15. The tube segment 14 has a split sleeve 16 constituting one end thereof and a tapered jaw 17 forming its opposite end and which constitutes a segment of a tube of arcuate cross section having a concave inner side and a convex outer side. Said jaw 17 diminishes in cross sectional width toward its extremity and the side edges 18 thereof, as best seen in Figure 7, are provided with spaced substantially V-shaped notches 19. The section 14 of the member 11 includes a short tubular portion 20 which is disposed between the jaw 17 and a long shank portion 21 of said member 14, which extends between the tubular portion 20 and the split sleeve 16. The shank portion 21 is approximately semicircular or half tubular, as best seen in Figure 4, and has its open concave inner side facing in the opposite direction to the open concave inner side of the jaw 17, as best seen in Figure 2. The tubular portion 20, which is disposed between the shank portion 21 and jaw 17, has aligned openings 22 in diametrically opposite portions thereof and which are disposed substantially parallel to the side edges of the shank portion 21.

A portion of the rod 15 extends loosely through said tubular portion 20 and a pin 23 extends loosely through said rod 15 and through the openings 22 for pivotally connecting the rod 15 to the member 14. The pin 23 has headed ends 24, as seen in Figure 6, disposed externally of the tubular portion 20. The rod 15 has a shorter tapered end which extends from the pivot 23 in the same direction as the jaw 17 and which forms a tapered jaw 25. The jaw 25 has transversely extending grooves or notches 26 in the inner side thereof to coact with the notches 19, and has a tapered and beveled free end 27 which extends outwardly from the outer end of the jaw 17, when the jaws are in closed positions.

The split sleeve 16 is constricted around one end of the cord 12 for securing the member 11 to said cord end, and said sleeve 16 is preferably provided with inwardly extending prongs or teeth 28 to effectively anchor the sleeve to the cord 12.

The stop or abutment 13 includes a cord clamp 29, as best seen in Figure 5, comprising two clamping jaws 30 each of which is approximately of semicircular cross section and each of which has a twisted and flattened shank end 31. The shank ends 31 are secured against one another by a pivot element 32 which permits the jaws 30 to be swung toward and away from one another. The jaws 30 are swung to substantially parallel positions relative to one another for engaging and clamping the other end of the cord 12 therein, and said jaws 30 are provided with inwardly extending teeth 33 which project from their concave inner sides and which are embedded in the cord 12 to prevent slippage of the cord relative to the jaws.

The stop or abutment 13 also includes a sleeve 34 having a flared outer end 35 and a bore 36 which tapers slightly toward the other, inner end 37 of said sleeve 34. The sleeve 34 at its inner end 37 has an extension forming an externally disposed loop or ring 38 to which a larger ring 39 is loosely connected.

The last mentioned end of the cord 12 is threaded through the bore 36 from the inner to the outer end of the sleeve 34 and also passes through the ring 39. The jaws 30 are then engaged with said cord end, as previously described, after which the cord 12 is drawn back through the sleeve 34 for drawing the free ends of the jaws 30 into the bore 36 until said jaws are wedged tightly in the sleeve 34 and thus held effectively clamped to the cord 12.

For stringing fish on the fish stringer 10, the needle 11 is held closed as illustrated in Figure 1 and in full lines in Figure 2, and the forward end 27 thereof is passed inwardly through the gills of a fish and outwardly through the mouth for stringing the fish on the cord 12. The closed jaws 17, 25 taper to a nearly a smooth point so that the member 11 can readily be passed through a fish, as previously described. The abutment or stop 13 will prevent a fish from sliding off of the cord 12. The cord 12 may be of any length to accommodate any number of fish and the needle 11 may be passed through the ring 39 to form a loop in the cord 12 in which the strung fish can be held.

Instead of removing the fish from the cord 12 one at a time over the closed needle 11, the ring 39 can be grasped and pulled in one direction while the shanks 31 are gripped and pulled in the opposite direction for disengaging the jaws 30 from the sleeve 34, so that said jaws can be disengaged from the cord 12. The sleeve 34 can then be removed from the cord 12, after which the fish can slide freely off of the end of the cord 12 to which the stop 13 was previously secured.

The member 11 is of sufficient length so that it can be utilized as a slender pliers-type implement for extracting a fishhook which is lodged too far inside of a fish to be engaged and removed with the fingers. For such use of the implement 11 as a hook extractor, the jaws 17 and 25 are inserted through the mouth of the fish and the rod 15 is swung to its dotted line position of Figure 2 for opening the jaws. The jaws are advanced until a part of the fishhook is engaged between the open jaws. By then swinging the longer end of the rod 15 back toward its full line position of Figure 2, the jaw 25 can be swung toward a closed position for gripping a part of the fishhook, not shown, between the jaws 17 and 25 and in one or more of the notches 19 and 26. With the fishhook thus effectively held clamped in the jaws, the extractor 11 can be manipulated for dislodging and extracting the fishhook.

Various modifications and changes are contemplated and may be resorted to, without departing from the function or scope of the invention as hereinafter defined by the appended claims.

I claim as my invention:

1. A combination fish stringer needle and fishhook extractor comprising an elongated substantially straight body member having an inner end forming a stringer cord anchoring portion and an outer end forming a hook gripping jaw, said body member including an elongated shank portion extending between said anchoring portion and jaw, said shank portion and jaw each being of arcuate cross section forming channels having open sides facing in opposite directions, an elongated rod forming a part of the needle and extractor and fitting in the channels of the shank and jaw in one position of said rod, means pivotally connecting the rod to the body member between the jaw and shank for movement of the rod ends into and out of engagement with said jaw and shank, said rod including a short end portion forming a movable jaw for movement into and out of engagement with the channel of the first mentioned jaw and a second longer end portion forming a handle for movement into and out of engagement with the channel of the shank.

2. A combination fish stringer needle and fishhook extractor as in claim 1, said jaws being outwardly tapered, said movable jaw having a beveled outer side, and said movable jaw fitting snugly in said first mentioned jaw in a closed position of the jaws whereby said jaws combine to form a tapered needle end.

3. A combination fish stringing needle and fishhook extractor as in claim 2, said movable jaw having a pointed end projecting beyond the outer end of the first mentioned jaw, in a fully closed position of the jaws, and constituting the pointed leading end of the stringing needle.

4. A combination fish stringing needle and fishhook extractor as in claim 1, said elongated body member including a tubular portion disposed between the jaw thereof and said shank portion and in which a part of the rod is loosely disposed, and said means pivotally connecting the rod to the body member extending through said tubular portion, said tubular portion and the anchoring portion being of approximately the same cross sectional size and of greater cross sectional size than the remainder of the needle and extractor.

References Cited in the file of this patent
UNITED STATES PATENTS

| | | |
|---|---|---|
| 1,270,593 | Biscayart | June 25, 1918 |
| 2,047,834 | Plasters | July 14, 1936 |
| 2,506,839 | Mead | May 9, 1950 |
| 2,612,303 | Butler | Sept. 30, 1952 |
| 2,619,859 | Peronto | Dec. 2, 1952 |
| 2,836,004 | Stader | May 27, 1958 |